(12) United States Patent
Sciarini

(10) Patent No.: US 6,651,833 B2
(45) Date of Patent: Nov. 25, 2003

(54) SELF SEALING CAP WITH SPRING AND POST

(75) Inventor: Gerald A. Sciarini, Solon, OH (US)

(73) Assignee: Impact Confections, Inc., Colorado Spring, CO (US)

( * ) Notice: Subject to any disclaimer, the term of this patent is extended or adjusted under 35 U.S.C. 154(b) by 0 days.

(21) Appl. No.: 10/072,269

(22) Filed: Feb. 5, 2002

(65) Prior Publication Data

US 2002/0179562 A1 Dec. 5, 2002

Related U.S. Application Data

(63) Continuation-in-part of application No. 09/874,448, filed on Jun. 4, 2001, now Pat. No. 6,561,371.

(51) Int. Cl.⁷ .............................................. B65D 51/18
(52) U.S. Cl. ..................... 215/236; 215/240; 215/313; 222/516
(58) Field of Search .................... 215/236, 240, 215/3, 313; 222/387, 516; 220/262

(56) References Cited

U.S. PATENT DOCUMENTS

| | | | |
|---|---|---|---|
| 781,332 A | 1/1905 | Demacakos |
| 793,757 A | 7/1905 | Williamson |
| 1,021,452 A | 3/1912 | Craven |
| 1,404,883 A | 1/1922 | Murray |
| 1,612,719 A | 12/1927 | Haddad |
| 1,963,050 A | 6/1934 | Graham |
| 2,018,050 A | 10/1935 | Bentley |
| 2,533,915 A | 12/1950 | Brooks |
| 2,636,649 A | 4/1953 | Corriveau |
| 2,824,010 A | 2/1958 | Petersen |
| 3,355,067 A | 11/1967 | Espinal |
| 3,410,462 A | 11/1968 | Donovan |
| 3,413,128 A | 11/1968 | Steinbarth et al. |
| 4,914,748 A | 4/1990 | Schlotter, IV et al. |
| 5,027,986 A | 7/1991 | Heinzel et al. |
| 5,209,692 A | 5/1993 | Coleman et al. |
| 5,370,884 A | 12/1994 | Coleman |
| 5,386,909 A | 2/1995 | Spector |
| 5,391,107 A | 2/1995 | Coleman |
| 5,540,353 A | 7/1996 | Coleman et al. |
| 5,615,941 A | 4/1997 | Shecter |
| 5,758,802 A | 6/1998 | Wallays |
| 5,820,437 A | 10/1998 | Coleman et al. |
| 5,853,093 A | 12/1998 | Neiger |
| 5,921,425 A | 7/1999 | Markey |
| 5,993,870 A | 11/1999 | Hoeting et al. |
| 6,136,352 A | 10/2000 | Silverstein et al. |
| 6,159,492 A | 12/2000 | Manzone et al. |
| D436,549 S | 1/2001 | Kosaan |
| 6,332,551 B1 | 12/2001 | Copeland |

FOREIGN PATENT DOCUMENTS

| | | |
|---|---|---|
| IT | 496889 | 8/1954 |
| WO | WO 00/19803 A2 | 4/2000 |

*Primary Examiner*—Jes F. Pascua
(74) *Attorney, Agent, or Firm*—Deborah A. Peacock; Katy C. Fain

(57) ABSTRACT

A self sealing rotating cap or lid for a bottle, container or other object. The cap comprises an aperture, a spring, an engaging/disengaging post, a resting position and a rotatable open position.

22 Claims, 9 Drawing Sheets

SELF SEALING CAP WITH SPRING AND POST

CROSS-REFERENCE TO RELATED APPLICATIONS

This application is a continuation-in-part application of U.S. patent application Ser. No. 09/874,448, entitled "Self Sealing Cap", to Sciarini, filed on Jun. 4, 2001, and the specification thereof is incorporated herein by reference.

This application is related to U.S. Utility Patent Applications entitled: Soda Bottle Confectionery," Ser. No. 09/874,440; "Confectionery With Body, Handle and Container," Ser. No. 09/874,446; "Soda Bottle Confectionery With Open Top," Ser. No. 09/874,447; and to U.S. Design Patent Applications entitled "Alien Head for Confectionery Product," Serial No. 29/142,929; "Alien Head for Confectionery Product," Serial No. 29/142,928; "Alien Head for Confectionery Product," Serial No. 29/142,930; "Alien Head for Confectionery Product," Serial No. 29/142,932, and "Alien Head for Confectionery Product," Serial No. 29/142,921, all of which are filed concurrently on even date herewith, and the specifications and drawings thereof are incorporated herein by reference.

COPYRIGHTED MATERIAL

A portion of the disclosure of this patent document and of the related applications listed above contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field):

The present invention relates to a self sealing cap, useful particularly for bottles with confectionery products.

SUMMARY OF THE INVENTION (DISCLOSURE OF THE INVENTION)

The present invention is of a self sealing cap for covering and providing an opening to an object, the cap comprising: an object comprising an object opening therein; a cap assembly disposed on the object, the cap assembly comprising an aperture and a spring; the cap assembly and the object having a resting position wherein the object opening is closed; the cap assembly and the object having an open position when the object opening is opened through the cap assembly aperture; the cap assembly rotatable by a user exerting force on the cap assembly from the resting position about the object to align the object opening with the cap assembly aperture in the open position to allow material from the object to pass through both the object opening and the cap assembly aperture; and the spring providing automatic counter rotation of the cap assembly back to the original position to thereby close the object opening after the user removes force from the cap assembly. In the preferred embodiment, the object comprises a bottle and the object opening is the top of the object. The object opening may be to a side of a longitudinal axis of the object. The cap assembly may be integral with the object. The object opening is preferably circular, as is the cap assembly aperture. The cap assembly may be attached to the object. The cap assembly preferably further comprises a thumb wedge, wherein one end of the spring is disposed in the thumb wedge. The cap assembly may further comprise knurls, a central post around which the spring is disposed, and at least one rim upon which the spring is stopped in rotation. The cap assembly is preferably rotatable about a central axis of the cap, with the central axis of the cap being coaxial with a central longitudinal axis of the object. The spring is preferably housed in a recess in the cap assembly. A seal may be disposed between the object and the cap assembly, wherein the seal comprises an o-ring about the object opening.

The invention is also of a self sealing cap for covering and providing an opening to an object, the cap comprising: an object comprising an object opening therein; a cap assembly disposed on the object, the cap assembly comprising: a central axis; an aperture to a side of the central axis; a spring; a thumb wedge comprising one end of the spring disposed therein; at least one stop upon which rotation of the cap assembly is stopped; the cap assembly and the object having a resting position wherein the object opening is closed; the cap assembly and the object having an open position when the object opening is opened through the cap assembly aperture; the cap assembly rotatable about the central axis by a user exerting force on the thumb wedge from the resting position about the object to the stop to align the object opening with the cap assembly aperture in the open position to allow material from the object to pass through both the object opening and the cap assembly aperture; and the spring providing automatic counter rotation of the cap assembly back to another stop and the original position to thereby close the object opening after the user removes force from the thumb wedge. In the preferred embodiment, the object comprises a bottle and the object opening is a top of the object. The object opening may be to a side of a longitudinal axis of the object. The object opening is preferably circular, as is the cap assembly aperture. The cap assembly preferably further comprises a central post around which the spring is disposed.

The present invention is still further of a self-closing cap assembly for an opening in a container comprising: a cap assembly carried by the container including a rotatable cap having an aperture and a torsional spring; the cap assembly having a resting position wherein the container opening is closed and a dispensing position wherein the container opening is open; the cap movable by a user exerting force against the spring so as to move the cap from a resting position to an open position; and the spring rotating the cap back to the closed position when the user applies force less than a spring force. In the preferred embodiment, the cap additionally includes a thumb wing attached to one peripheral end of the cap for receiving rotational force from a user.

The present invention is also a self sealing cap for covering and providing an opening to an object. The cap comprises an object which has an object opening. The cap assembly is disposed on the object and comprises an aperture and a spring and a post. The cap assembly and the object have a resting position wherein the object opening is closed; and the cap assembly and the object have an open position when the object opening is opened through the cap assembly aperture. The cap assembly is rotatable by a user by exerting force on the cap assembly and the spring and post, providing rotation from the resting position about the object to align the object opening with the cap assembly aperture in the open position to allow material from the object to pass through both the object opening and the cap assembly aperture. The spring and post provide automatic counter rotation of the cap assembly back to the original position to thereby close the object opening after the user removes force from the cap assembly.

The object may comprise a bottle. The cap assembly may be integral with the object or may be attached to the object. The cap assembly may additionally comprise a thumb wedge and may comprise a central post around which the spring is disposed.

The cap assembly may be rotatable about a central axis of the cap. Such a central axis may be coaxial with a central longitudinal axis of the object. The spring may be housed in a recess in the cap assembly and may comprise a fixed end and a rotatable end. It may additionally have at least one stop for the fixed end of the spring. Preferably, it will have two stops, wherein the fixed end of the spring is disposed therebetween. The fixed end of the spring may be straight. The cap assembly may comprise at least one stop for the rotatable end of the spring. The cap may comprise two stops, an open position stop and a closed position stop, where the rotatable end of the spring is rotatable therebetween. The rotatable end of the spring may be engageable for rotation and counter-rotation by a post extending from the underside of the cap.

The present invention may comprise a self sealing cap for covering and providing an opening to an object comprising an object with an object opening and a cap assembly disposed on the object, wherein the cap assembly comprises a central axis; an aperture to a side of the central axis; a spring; a post engageable with the spring; a thumb wedge; at least one stop upon which rotation of the cap assembly is stopped; the cap assembly and the object having a resting position wherein the object opening is closed; the cap assembly and the object having an open position when the object opening is opened through the cap assembly aperture; the cap assembly rotatable about the central axis by a user exerting force on the thumb wedge and the spring and post providing rotation from the resting position about the object to the stop to align the object opening with the cap assembly aperture in the open position to allow material from the object to pass through both the object opening and the cap assembly aperture; and the spring and post providing automatic counter rotation of the cap assembly back to another stop and the original position to thereby close the object opening after the user removes force from the thumb wedge.

The present invention is also a self-closing cap assembly for an opening in a container comprising a cap assembly carried by the container including a rotatable cap having an aperture, a torsional spring and an engaging post; wherein the cap assembly has a resting position when the container opening is closed, and a dispensing position when container opening is open; wherein the cap is movable by a user by exerting force against the spring and post so as to move the cap from a resting position to an open position; and wherein the spring and post rotate the cap back to the closed position when the user applies force less than a spring force.

The present invention includes a method of use of a cap assembly comprising providing a cap assembly disposed on an object having a rotatable cap with an aperture and a torsional spring disposed on a cap base on the object, wherein the cap base comprises a recessed area having stops and an aperture; providing the cap assembly in a resting position wherein the container aperture is in a closed position, unaligned with the cap aperture; rotating the cap laterally by exerting force, wherein the force is applied against a thumb wedge and/or cap knurls; transferring the force applied to the cap to the spring by displacing a rotatable end of the spring; aligning the cap aperture with the container aperture thereby providing an open position; inverting the container; allowing flowable materials to flow through both apertures by the force of gravity; righting the container; removing the force applied to cap and thereby removing force to the spring; and rotating the cap automatically back to its closed, resting position when the spring returns to its disengaged state. The method may additionally comprise the steps of providing an engaging post disposed on a lower surface of the rotatable cap wherein said post is positioned to engage the rotatable end of said spring and rotating the engaging post to engage the spring, thereby transferring the force to the spring.

The object of the present invention is to provide a self sealing cap/lid for a container or other object.

Other objects, advantages and novel features, and further scope of applicability of the present invention will be set forth in part in the detailed description to follow; taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is a self sealing cap, particularly useful for bottles, containers, or other objects and most particularly useful for flowable confectionery bottles, such as disclosed in related pending applications entitled "Self-Sealing Cap" and "Soda Bottle Confectionery with Open Top," incorporated herein by reference.

Figure 1:
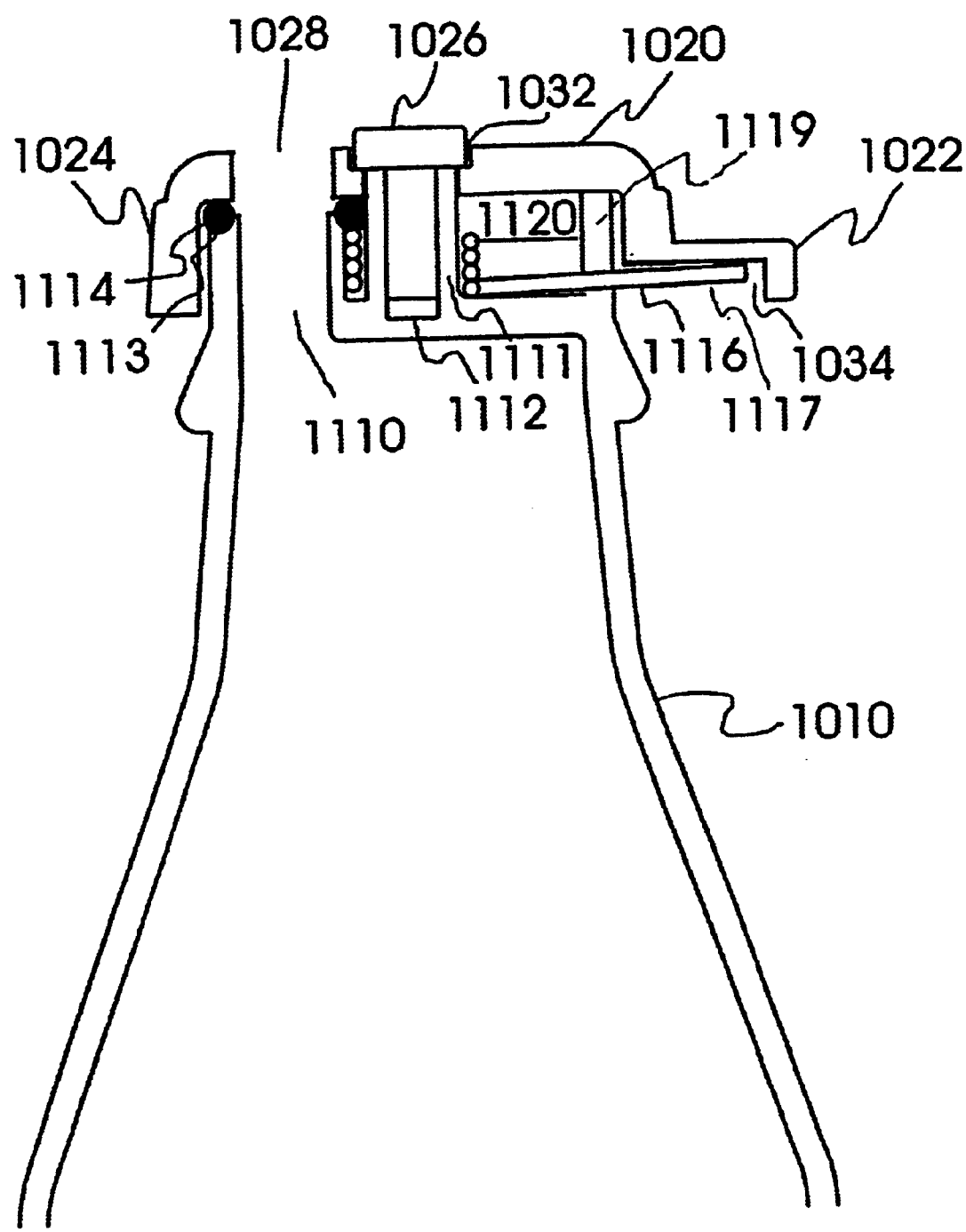
FIG. 1 is a side view of a bottle with self sealing cap assembly of the present invention.

FIG. 1 is a side view of a bottle-shaped container 1010 of the present invention. FIGS. 1–4 show one embodiment of a cap 1020 of the present invention.

This embodiment comprises a rotating cap 1020 on bottle 1010 or other object, as shown in the drawings. Cap 1020 is part of a cap assembly. Cap 1020 comprises a central aperture 1032 to fix cap 1020 to bottle 1010. A screw 1026 passes through central aperture 1032. Alternatively, cap assembly is integral with the bottle or other object. Cap 1020 is rotatable about a central axis of screw 1026, which is preferably, but optionally coaxial with the longitudinal axis of bottle 1010. Rotatable cap 1020 further comprises an off-center aperture 1028 that is positioned to allow for removal of material (e.g., a flowable liquid or confectionery) from bottle 1010.

Figure 2:
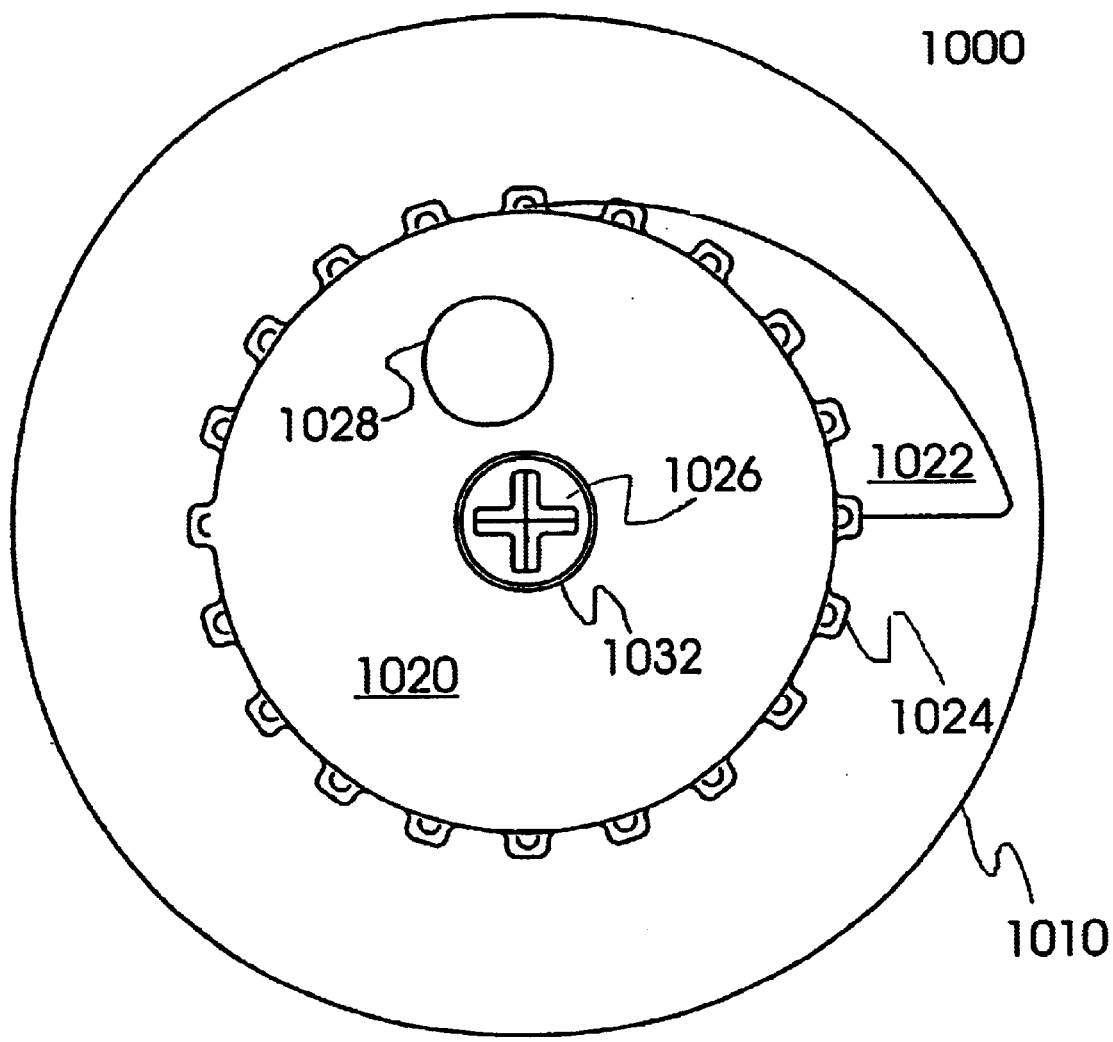
FIG. 2 is a top view of the cap assembly of the FIG. 1 embodiment.

Cap 1020 optionally comprises a thumb wedge or protrusion 1022 and/or knurls 1024, as shown in FIG. 2. Knurls 1024 mimic those of a traditional metal-capped or crimped soda bottle. Thumb wedge 1022 and knurls 1024 facilitate rotation of cap 1020. Thumb wedge 1022 may also help a user grasp the bottle 1010 or other item to which cap 1020 is attached.

A side, cross-sectional view of bottle 1010, is shown in FIG. 1. The cap base comprises an aperture 1110 (preferably circular) for removal of material from bottle 1010. Cap assembly comprises an approximately 270 degree pie-shaped, recessed region 1120 for housing, in part, a spring 1116. Cap 1020 further comprises an aperture 1028 (preferably circular) therein. When a user wants to remove material from bottle 1010, the user rotates cap 1020 to align off-center aperture 1028 with aperture 1110 in cap 1020. In the embodiment shown, alignment of the cap and bottle apertures 1028, 1110 is achieved, for example, by rotating cap 1020 in a counter-clockwise direction about the axis of screw 1026. An o-ring 1114, seated in an annular recess 1113, is used to minimize undesirable migration of material from bottle 1010. Annular recess 1113 surrounds aperture 1110 of bottle 1010. O-ring 1114, is seated therein, forming a seal between cap 1020 and bottle 1010.

Screw 1026 fixes cap 1020 to the cap base or bottle 1010. Screw 1026 passes through central aperture 1032 of cap 1020 and is secured in a cylindrical opening 1112, which is defined by a cylindrical wall 1111. Cylindrical wall 1111 further serves as a post around which spiral-wound spring 1116 is seated. As shown in FIG. 1, part of o-ring 1114 extends over part of spring 1116; this arrangement helps to secure spring 1116 around cylindrical post 1111. Spring 1116 is positioned within the cap assembly to keep cap 1020 in a closed position; thus, force must be applied to cap 1020 to align cap aperture 1028 with bottle aperture 1110, and thus allow the user to remove material from bottle 1010. Thus, the term "self sealing cap" is used to describe the present invention. This self sealing is particularly important when a flowable confectionery is disposed within bottle 1010.

Figure 3:
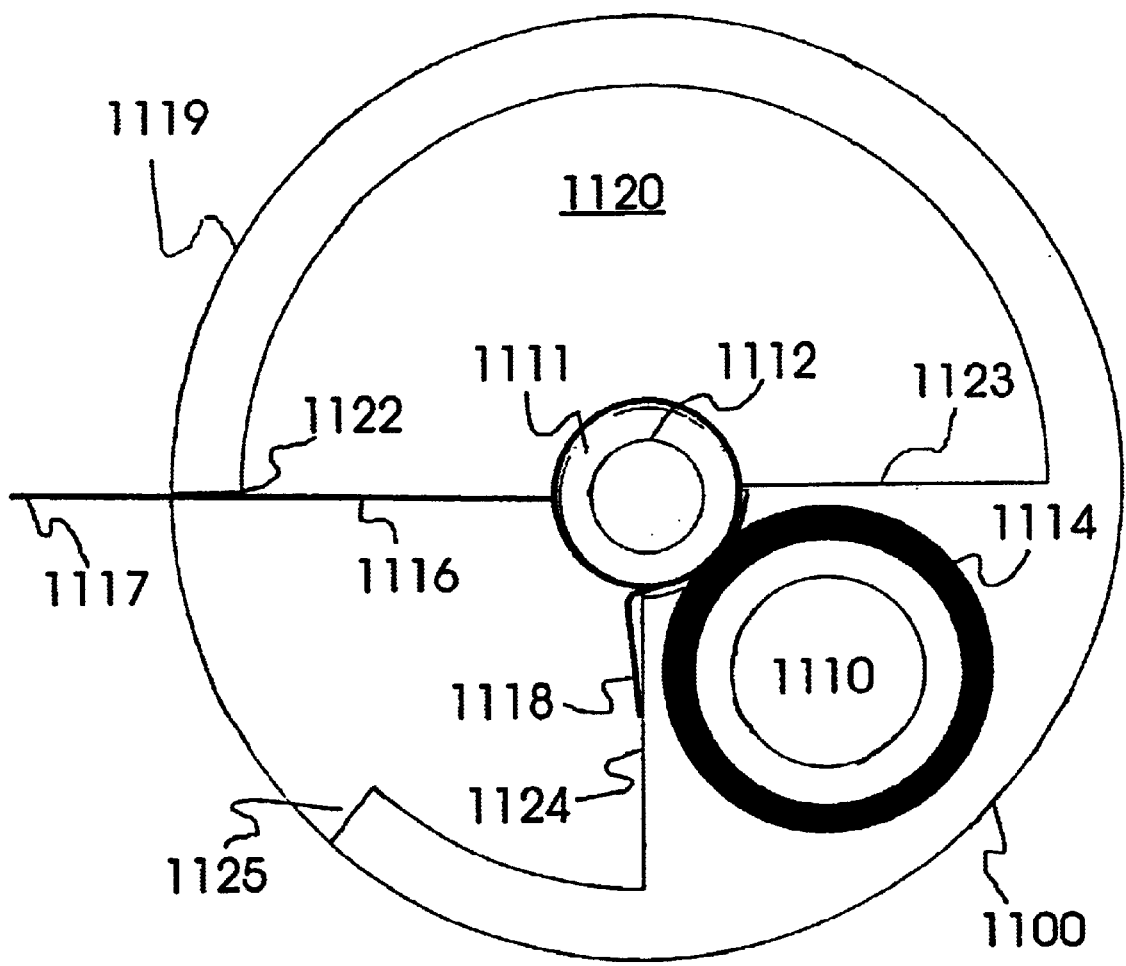
FIG. 3 is a top view of the cap base of the FIG. 1 embodiment.

Referring to FIG. 3, a top view of cap base or bottle 1010 is shown. The cap base shown herein has a 360 degree reference system having 0 degrees and 180 degrees defined along a horizontal axis from right to left and 90 degrees and 270 degrees defined along a vertical axis from to top to bottom. As shown in FIG. 3, recessed region 1120 comprises an approximately 270 degree pie-shape. Cylindrical opening 1112, defined by cylindrical wall 1111, is located at the center of this recessed region 1120. Recessed region 1120 comprises two internal walls that both start from a radius just greater than the radius of cylindrical wall 1111. One of the walls is located at approximately 0 degrees 1123 (0 degree wall) and the other located at approximately 270 degrees 1124 (270 degree wall). These two walls extend radially and terminate against a rim 1119. Rim 1119 surrounds recessed region 1120, except for an approximately 45 degree cutout section 1125. The cutout section is bounded/defined by two walls or stops, one at approximately 180 degrees 1122 (180 degree stop) and another at approximately 225 degrees 1125 (225 degree stop).

In the preferred embodiment, spring 1116 comprises a long end 1117 and a short end 1118. Long end 1117 extends from the spring's spiral core and is seated in a channel 1034 in the cap's thumb wedge 1022. This end 1117 is biased directly or indirectly against the 180 degree stop 1122 of rim 1119. Short end 1118 also extends from the spiral core of spring 1116 and is biased against the 270 degree stop 1124 of recessed region 1120. Thus, application of force to rotate cap 1020 in a counter-clockwise direction causes long end 1117 of spring 1116 to rotate and consequently, the cap 1020 to rotate. In the preferred embodiment, rotation of cap 1020 to the 225 degree stop 1125 results in alignment of cap aperture 1028 and bottle aperture 1110, in an open position. Once the applied force is released, tension in spring 1116 causes long end 1117 of spring to sweep in a clockwise direction towards the 180 degree stop 1122 to close cap 1020, in a resting position.

Figure 4:
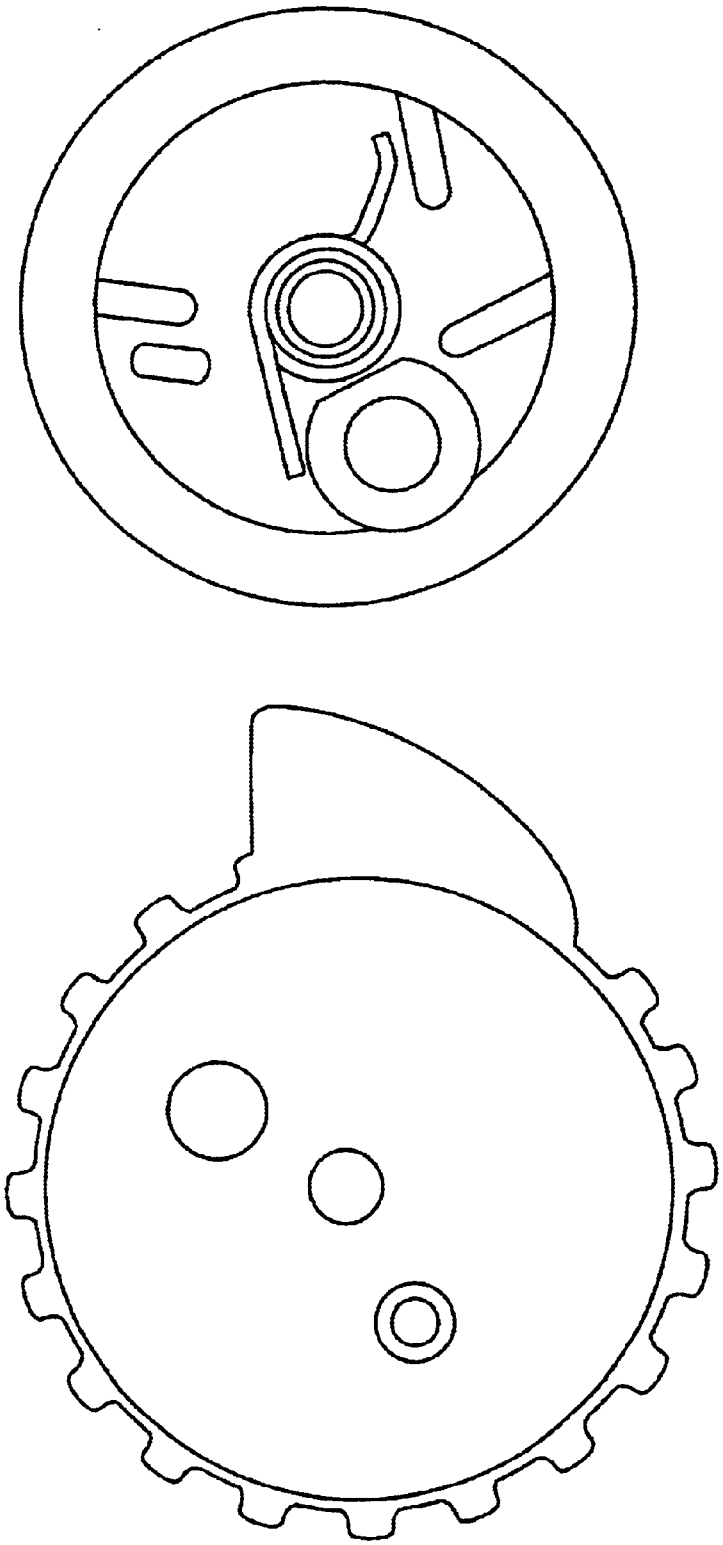
FIG. 4 is a perspective view of the cap assembly of FIGS. 2 and 3.

FIG. 4 shows a perspective and sectional view of portions of the upper (turned over) and lower embodiment of the cap assembly of the present invention.

FIGS. 5–9 show a preferred embodiment of the present invention.

Figure 5:
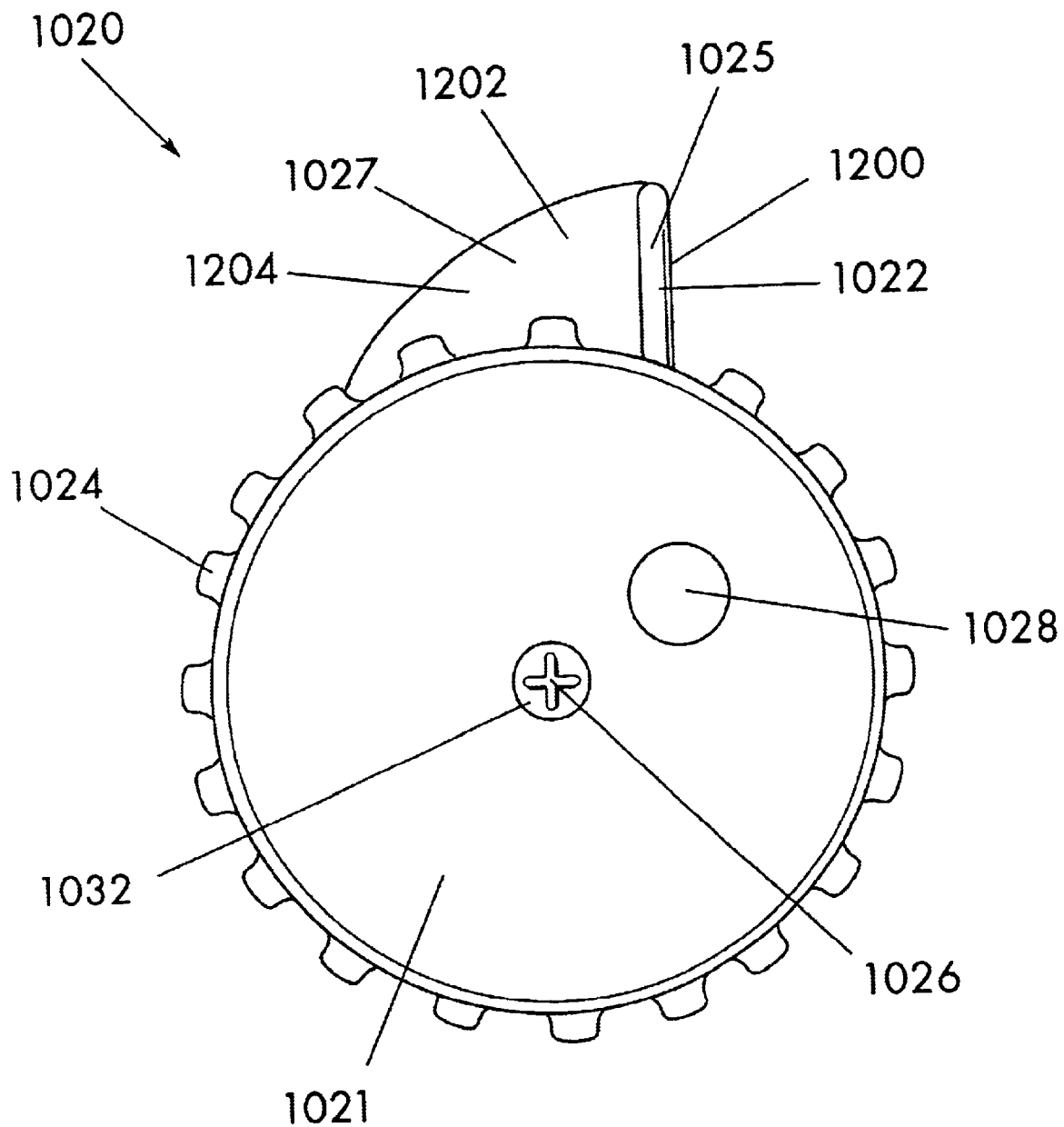
FIG. 5 is a top view of a preferred cap of the present invention.
Figure 6:
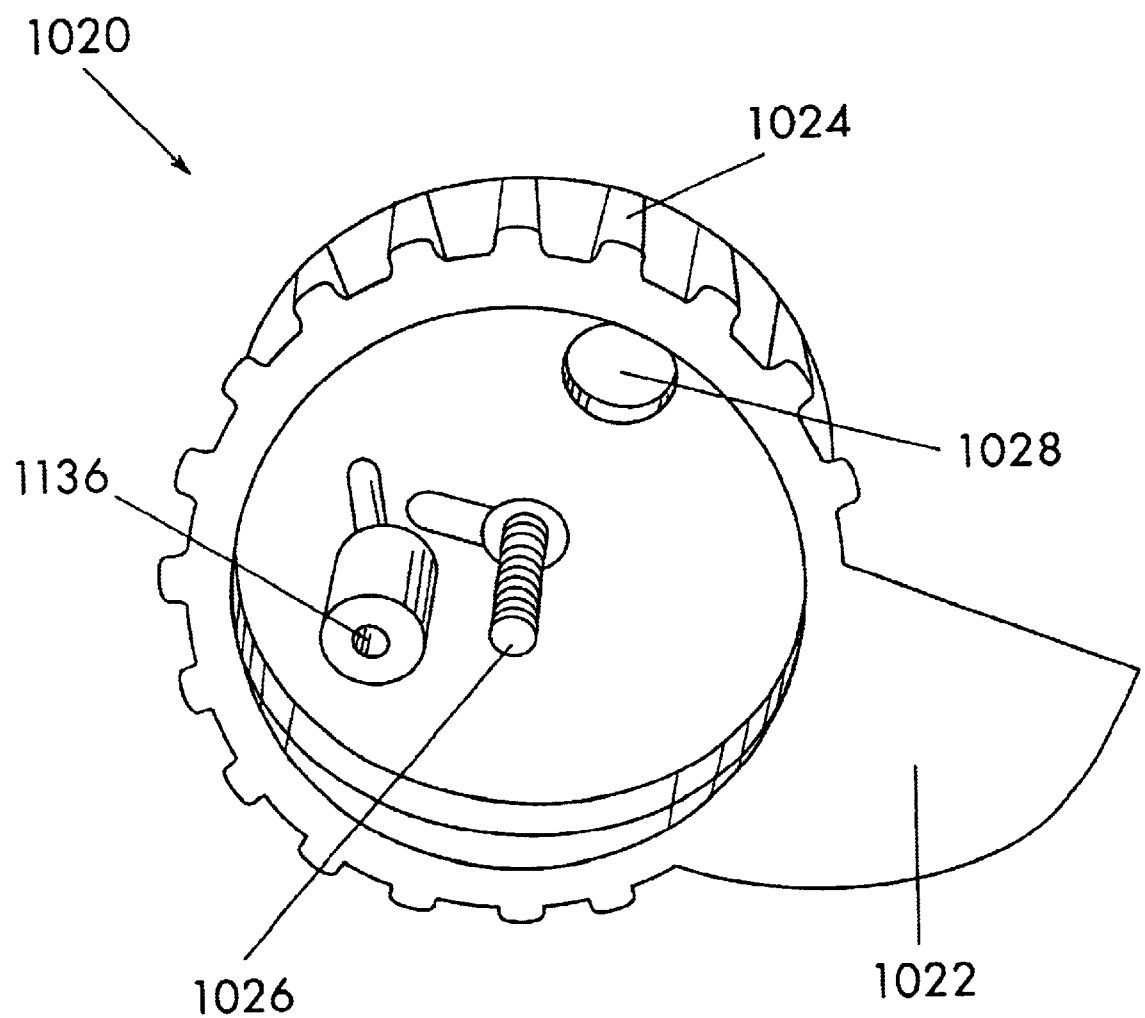
FIG. 6 is a bottom view of the cap of FIG. 5.

FIG. 5 is a top view and FIG. 6 is a bottom view of a preferred embodiment of cap assembly 1020. In this embodiment, cap 1021 comprises a central aperture 1032 to fix cap assembly 1020 to bottle 1010 via screw 1026 (see FIG. 6). Screw 1026 passes through central aperture 1032 of post 1617. Cap 1021 is rotatable about a central axis of screw 1026, which is preferably, but optionally coaxial with the longitudinal axis of bottle. Rotatable cap 1021 further comprises an off-center aperture 1028 that is positioned to allow for removal of material (e.g., a flowable liquid or confectionery) from bottle. Cap 1021 preferably comprises thumb wedge or protrusion 1022 and/or knurls 1024 that facilitate rotation of cap 1021. Thumb wedge 1022 preferably comprises vertical element 1025 and horizontal element 1027. Vertical element 1025, as depicted in FIG. 5, encompasses end region 1200 of thumb wedge 1022 and provides an extra gripping surface to prevent finger slippage when a user movably engages thumb wedge 1022. Horizontal element 1027 is disposed between vertical element 1025 and cap 1021 and preferably comprises a substantially planar upper surface 1202 and curved outer sides 1204 for engagement of a user's thumb or other fingers. In alternate embodiments, additional vertical elements may be utilized to improve the gripping upper surface, and, additionally, the outer sides of both elements 1025, 1027 may comprise a different shape. Cap 1021, in this preferred embodiment, additionally comprises post 1136 which extends from under side of cap 1021 to effectively provide tension to spring 1116 (see FIG. 8) and rotate and bias cap 1021 to an open or engaged position.

Figure 7:
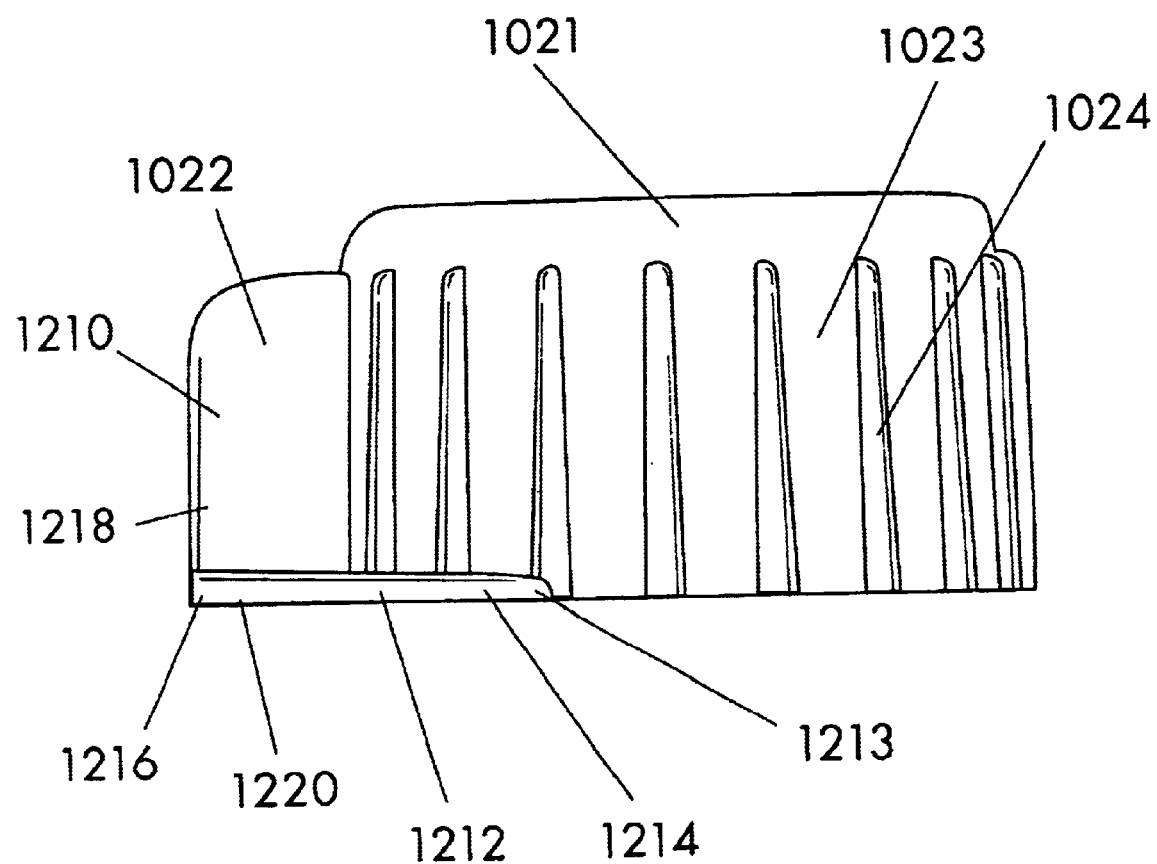
FIG. 7 is a side view of an alternate embodiment of the cap.

As shown in FIG. 7, an alternate embodiment of cap assembly 1020 comprises elongated outer cylindrical wall 1023 of cap 1021. Outer cylindrical wall 1023 additionally comprises knurls 1024 and/or a thumb wedge or protrusion 1022. As in the preferred embodiment, thumb wedge 1022 facilitates rotation of cap 1021. Thumb wedge 1022, as depicted in FIG. 7 comprises a vertical element 1210 extending from cylindrical wall 1023 having the same or substantially the same vertical height as cylindrical wall 1023. Horizontal element 1212 additionally extends from wall 1023 at a point 1213 at a distance approximately ⅙ of the circumference of cylindrical wall 1023. Horizontal element 1212 comprises a substantially planar surface with outer curving side 1214 extending to intersection 1216 of outer side 1218 and lower side 1220 of vertical element 1210. Horizontal element 1212 may serve as a thumb slide or as a strengthening element for vertical element 1210, depending on its orientation to the rotatable end of the spring in the cap assembly. While a substantially rectangular wedge shape has been depicted and described for vertical element 1210, other wedge shapes are within the purview of the invention. Additionally, horizontal element 1212 may extend from points further from and closer to vertical element 1210, and may comprise different outer side configurations.

Figure 8:
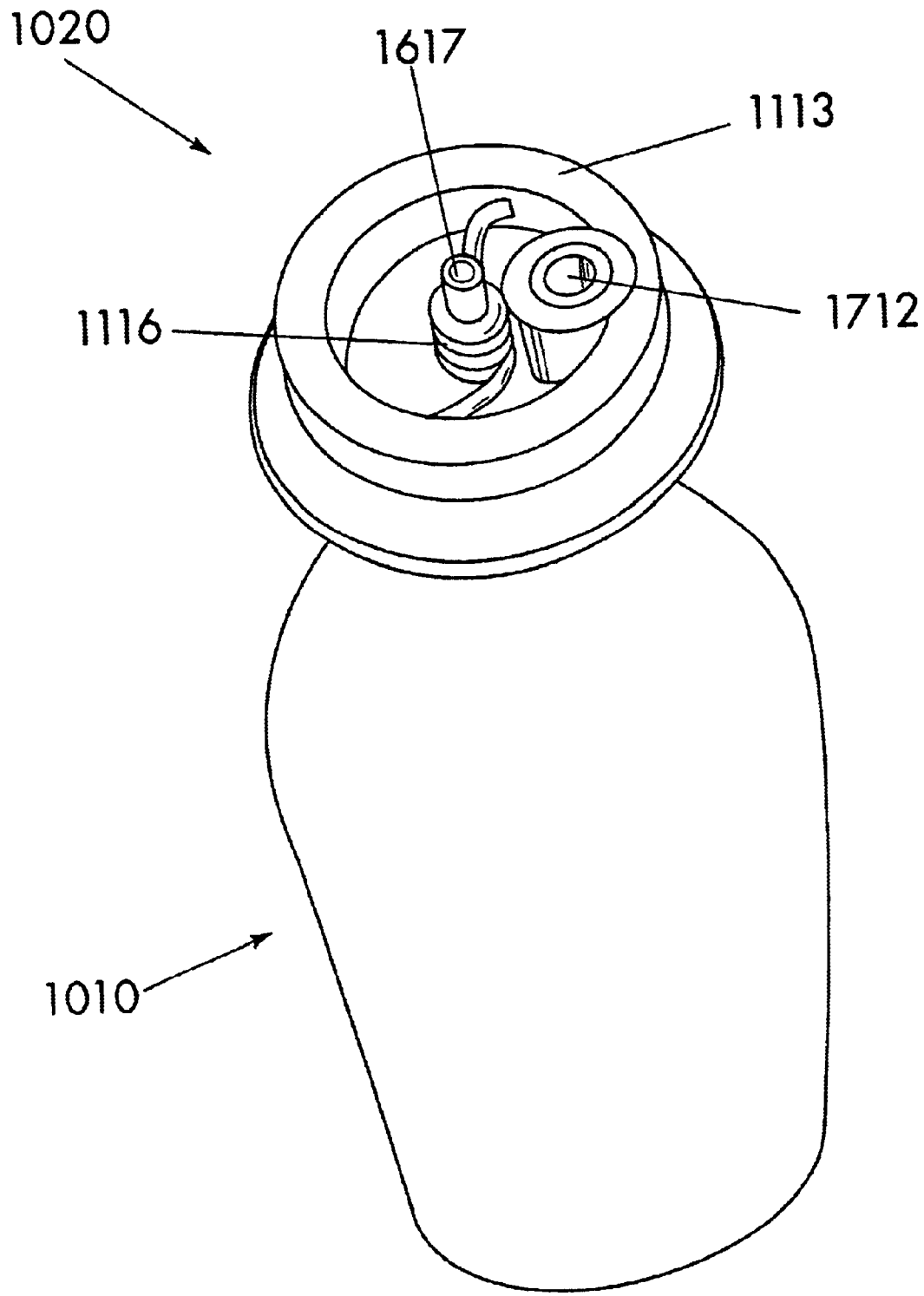
FIG. 8 is a perspective view of the preferred cap assembly and bottle portion for use with the cap of FIGS. 5 and 6.

FIG. 8 is a perspective view showing bottle 1010 with preferred cap assembly 1020 of the present invention. As shown therein, and in FIGS. 5 and 6, opening 1712 allows for passage of confectionery from bottle 1010 through opening 1712, then through aperture 1028 of cap 1021, when cap 1021 is engaged (when the user rotates cap 1021 about central axis of screw 1026). The user needs to turn bottle 1010 upside down or at a downward angle to allow confectionery to flow out of opening 1712 and aperture 1028. When cap 1021 is in a resting or disengaged position, aperture 1028 does not align with opening 1712, opening 1712 and aperture 1028 are thereby closed, and the confectionery remains in bottle 1010, even when tilted or inverted.

Figure 9:
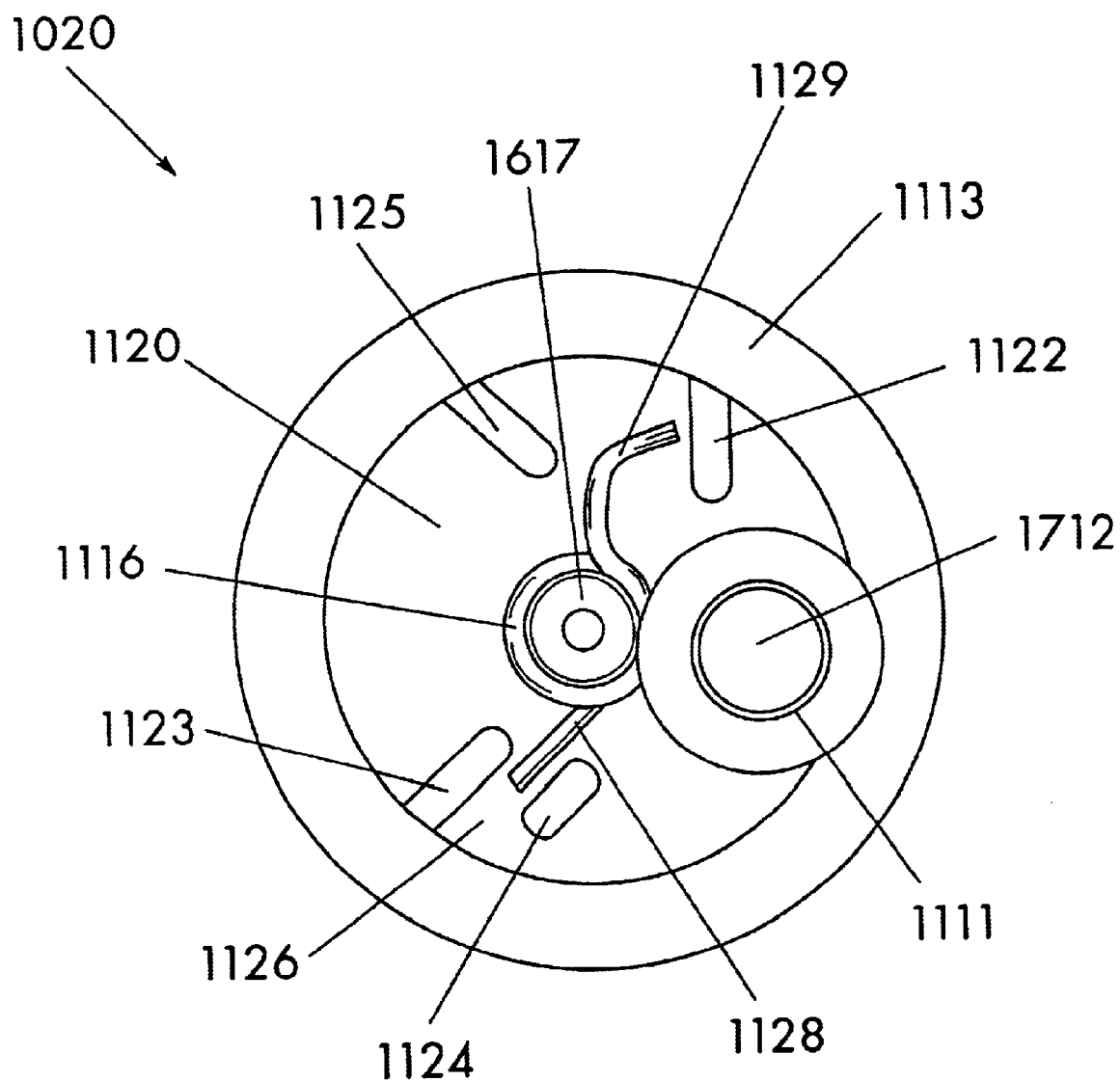
FIG. 9 is a top view of the FIG. 8 cap assembly.

FIG. 9 is a top view of cap assembly 1020 disposed above bottle 1010 (see FIG. 7). As shown therein, cap base 1113 provides for rotation of spring 1116 and cap 1021 (see FIGS. 5 and 6). Spring 1116 spirals about central post 1617, is fixed in position on one end between two stops 1123 and 1124 and rotates between two stops 1122 (closed or disengaged position) and 1125 (open or engaged position). Cap base 1113 has a 360 degree reference system having 0 degrees and 180 degrees defined along a horizontal axis from right to left and 90 degrees and 270 degrees defined along a vertical axis from to top to bottom. Recessed region 1120 comprises the entire 360 degrees, with the exception of several protruding stops 1122, 1123, 1124 and 1125. Cylindrical opening 1712, defined by cylindrical wall 1111, is intersected by the 0–180 degree axis and is located adjacent to a side wall of cap base 1113 of recessed region 1120. Recessed region 1120 additionally comprises four vertically protruding stops 1122, 1123, 1124 and 1125. One stop 1123 is located at approximately 225 degrees, another stop 1124 is located adjacent to stop 1124 at approximately 250 degrees. These two stops 1123 and 1124 extend at an axis slightly off radius and directed toward opening 1712. Stops 1123 and 1124 lie in a side-by-side arrangement comprising space 1126. Space 1126 is sufficient for receipt of straight end 1128 of spring 1116 extending from a lowerend of its spiral core. Curved end 1128 extends from a substantially straight extension 1130 from the spiral core. Straight end of spring 1128 is disposed within space between stops 1123 and 1124 and does not move or only slightly moves.

Stop 1125 is positioned at approximately 110 degrees. Stop 1122 is positioned at approximately 45 degrees. Curved end 1129 of spring 1116 is disposed between and rotates between stops 1125 and 1122. Curved end 1129 of spring 1116 is engaged by cap post 1136 (see FIG. 6) for this rotation.

When cap 1021 is in its resting position (closed position), curved spring end 1129 rests or stops at stop 1122 and aperture 1028 of cap 1021 does not align with opening 1712 of cap base 1113. In this position, confectionery cannot flow out of bottle 1010. When cap 1021 is rotated (e.g., by thumb wedge 1022), spring curved end 1129 rotates to stop 1125 by engagement with post 1136, thereby aligning opening 1712 and aperture 1028 so confectionery can flow out of bottle 1010. In the open position, spring 1116 is in tension, so that the user must continue to use force (e.g., by thumb wedge 1022) to keep this rotation and alignment. As soon as the user releases the force (e.g., stops holding thumb wedge 1022), curved end 1129 of spring 1116 immediately returns to stop 1122 (thereby releasing spring tension), in its closed or disengaged position. In this position aperture 1028 and opening 1712 are not aligned, are closed, and confectionery does not flow out of bottle 1010. As can be appreciated by those skilled in the art, other embodiments and equivalents can be utilized to accomplish the rotation, engagement/disengagement, stops and alignment. For instance, straight end 1128 of spring 1116 need not be straight and curved end 1129 of spring 1116 need not be curved; rather one end needs to be substantially fixed and the other end needs to freely rotate between two stops or positions. Likewise, the approximate angles noted above may be changed to any angles desired to effectively provide tension to spring 1116 and bias cap 1020 to an open position.

Although the invention has been described in detail with particular reference to these preferred embodiments, other embodiments can achieve the same results. Variations and modifications of the present invention will be obvious to those skilled in the art and such variation and modifications are covered in this disclosure to the extent that they are modifications and/or equivalents. The entire disclosures of all references, applications, patents, and publications cited above are hereby incorporated by reference.

What is claimed is:

1. A self sealing cap for covering and providing an opening to an object, said cap comprising:

a cap assembly comprising a central body, an aperture, a spring comprising a fixed end and a rotatable end, a post, and an extension extending sideways and horizontally from and beyond said central body;

said cap assembly further comprising at least two stops wherein said fixed end of said spring is disposed between said stops;

said cap assembly having a resting position when said aperture is closed;

said cap assembly having an open position when said cap assembly aperture is open;

said cap assembly rotatable by a user exerting force on said extension of said cap assembly and said spring and post providing rotation from said resting position to said open position to allow material to pass through said cap assembly aperture; and said spring and post providing automatic counter rotation of said cap assembly back to said resting position to thereby close said aperture after the user removes force from said extension of said cap assembly.

2. The self sealing cap of claim 1 further comprising the object.

3. The self sealing cap of claim 2 wherein said cap assembly is integral with said object.

4. The self sealing cap of claim 2 wherein said cap assembly is attached to said object.

5. The self sealing cap of claim 1 wherein said cap assembly extension comprises a thumb wedge.

6. The self sealing cap of claim 1 wherein said cap assembly post comprises a central post around which said spring is disposed.

7. The self sealing cap of claim 1 wherein said cap assembly is rotatable about a central axis of said cap.

8. The self sealing cap of claim 7 wherein said central axis of said cap is coaxial with a central longitudinal axis of said object.

9. The self sealing cap of claim 1 wherein said spring is housed in a recess in said cap assembly.

10. The self sealing cap of claim 1 wherein said fixed end of said spring is straight.

11. A self closing cap assembly for an opening in a container, said assembly comprising:

a cap assembly carried by said container including a rotatable cap comprising a central body, an aperture, a torsional spring comprising a fixed end and a rotatable end, and two stops wherein said fixed end of said spring is disposed therebetween, an engaging post and an extension extending sideways and horizontally from and beyond said central body;

said cap assembly having a resting position wherein said container opening is closed and a dispensing position wherein said container opening is open;

said cap movable by a user exerting force against said extension so as to move said cap from a resting position to an open position; and said spring and post rotating said cap back to said closed position when the user applies force less than a spring force to said extension.

12. The self closing cap assembly of claim 11 wherein said container comprises a bottle.

13. The self closing cap assembly of claim 11 wherein said cap assembly is integral with said object.

14. The self closing cap assembly of claim 11 wherein said cap assembly is attached to said object.

15. The self closing cap assembly of claim 11 wherein said cap assembly further comprises a thumb wedge.

16. The self closing cap assembly of claim 11 wherein said post is a central post around which said spring is disposed.

17. The self closing cap assembly of claim 11 wherein said cap assembly is rotatable about a central axis of said cap.

18. The self closing cap assembly of claim 11 wherein said central axis of said cap is coaxial with a central longitudinal axis of said object.

19. The self closing cap assembly of claim 11 wherein said spring is housed in a recess in said cap assembly.

20. The self closing cap assembly of claim 11 wherein said fixed end of said spring is straight.

21. The self closing cap assembly of claim 11 wherein said two stops comprise an open position stop and a closed position stop.

22. The self closing cap assembly of claim 11 wherein said rotatable end of said spring is engageable for rotation and counter-rotation by a post extending from an underside of said cap.

* * * * *